United States Patent
Rane et al.

(10) Patent No.: US 8,473,537 B2
(45) Date of Patent: Jun. 25, 2013

(54) SECURE MULTI-PARTY COMPUTATION OF NORMALIZED SUM-TYPE FUNCTIONS

(75) Inventors: Shantanu Rane, Cambridge, MA (US); Ye Wang, Brookline, MA (US); Wei Sun, Cambridge, MA (US); Prakash Ishwar, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 421 days.

(21) Appl. No.: 12/890,151

(22) Filed: Sep. 24, 2010

(65) Prior Publication Data
US 2011/0040820 A1 Feb. 17, 2011

(51) Int. Cl.
*G06F 7/38* (2006.01)
(52) U.S. Cl.
USPC .......................................................... 708/441

(58) Field of Classification Search
USPC .......................................................... 708/441
See application file for complete search history.

(56) References Cited

U.S. PATENT DOCUMENTS
2006/0262865 A1* 11/2006 Moran ........................ 375/257

* cited by examiner

*Primary Examiner* — Tan V. Mai
(74) *Attorney, Agent, or Firm* — Dirk Brinkman; Gene Vinokur (57) ABSTRACT

Embodiments of present invention disclose a system and a method for determining a result of a function applied to a first vector and a second vector, wherein the function is a normalized sum-type function. The first vector is stored at a first processor, and the second vector is stored at a second processor. The system and the method determine a joint empirical probability distribution (JEPD) of the first vector and the second vector using a secure multi-party computation. The function is determined as a normalized summation of products of values of the JEPD with corresponding values of the function.

14 Claims, 4 Drawing Sheets

SECURE MULTI-PARTY COMPUTATION OF NORMALIZED SUM-TYPE FUNCTIONS

FIELD OF THE INVENTION

This invention relates generally to secure multi-party computation, and more particularly to secure multi-party computation of normalized sum-type functions.

BACKGROUND OF THE INVENTION

Secure Multi-Party Computation

In cryptography, secure multi-party computation (SMPC) is a problem that was initially suggested by Andrew C. Yao in 1982 as the "millionaire problem." Alice and Bob are two millionaires who want to find out who is richer without revealing the precise amount of their wealth. Yao proposed a solution allowing Alice and Bob to satisfy their curiosity while respecting the constraints.

In general, SMPC refers to computational systems in which multiple parties jointly compute some value based on individually held secret information, without revealing the information any of the other parties.

For example, a first party (Alice) and a second party (Bob), have secret data. The first party has, e.g., a vector X, and the second party has a vector Y. The first and the second parties need to compute a function $f(X, Y)$, often with an assistance from a third party (Charles), without revealing the secret data to each other. To that end, the parties must have a function computation protocol that satisfies certain conditions.

For example, one condition is that the first and the second parties do not disclose corresponding secret data to other parties at any stage during the computation of the function. Another condition is that the protocol incurs a small computation overhead at each party and has low transmission overhead between any pair of parties.

Unfortunately, conventional SMPC methods for computing the function $f$, in general form, have high computational complexity at each party and the transmission overhead between any pair of parties can also be impractically high. In some situations, computing the function $f$ using any of conventional state-of-the-art SMPC methods can even be impossible.

Accordingly, it is desirable to provide a SMPC method to compute even those functions that have complicated mathematical expressions with low computational and communication overhead at the participating parties.

SUMMARY OF THE INVENTION

Embodiments of an invention are based on the realization that every normalized sum-type function is expressible in terms of a joint empirical probability distribution (JEPD). Therefore, to compute the result of a function applied to, e.g., two vectors, using a secure multi-party computation (SMPC), it is sufficient to use SMPC to compute the JEPD of the two vectors, which, in a number of applications, significantly decreases computational complexity and transmission overhead. Knowing the JEPD, a value of the function can be determined as a normalized summation of products of values of the JEPD with corresponding values of the function.

The realization behind the embodiments of the invention reveals a source of a problem to be solved, and solves the problem in an unconventional manner in the field of SMPC. Conventional approaches for determining the result of a complex function either use known cryptographic primitives or adjust the SMPC protocol to the specifics of that function. The complexity resulting from such approaches was not considered a problem, but rather accepted as a natural consequence of secure computation.

In contrast to the state of the art, the embodiments of the invention reduce secure determination of the result of the function of two vectors to the secure determination of the JEDP of the two vectors.

For example, in one embodiment, the function is specified explicitly in the form of a look-up table comprising all possible pairs of values of the two vectors and the corresponding results of the function. In this embodiment, an expression of the function is not specified. This embodiment uses a SMPC protocol to determine the JEPD of all possible pairs of values and determines the result of the function as a normalized summation of products of values of the JEPD with corresponding results of the function from the look-up table.

Accordingly, one embodiment of present invention disclose a method for determining a result of a function applied to a first vector and a second vector, wherein the function is a normalized sum-type function. The first vector is stored at a first processor, the second vector is stored at a second processor. The method determines a joint empirical probability distribution (JEPD) of the first and the second vector using a secure multi-party computation (MPC); and determines the result of the function as a normalized summation of products of values of the JEPD with corresponding results of the function, wherein the steps of the method performed at least by the first and the second processors.

Another embodiment of the invention discloses a system for determining a result of a function applied to a first vector and a second vector using a third processor, wherein the function is a normalized sum-type function, the first vector is stored at a first processor, the second vector is stored at a second processor, comprising: means for determining a joint empirical probability distribution (JEPD) of the first and the second vector using a secure multi-party computation (MPC); and means for determining the result of the function as a normalized summation of products of values of the JEPD with corresponding values of the function, wherein the steps of the method performed at least by the first and the second processors.

Yet another embodiment discloses a system for determining a result of a function applied to a first vector and a second vector using a third processor, wherein the function is a normalized sum-type function, the first vector is stored at a first processor, the second vector is stored at a second processor, comprising: means for determining, for each corresponding pair of elements of the first vector and the second vector, a set of indicator matrices representing an obfuscated JEPD; means for splitting the set of indicator matrices into a first additive share and a second additive share; means for transmitting the first additive share to the first processor and the second additive share to the second processor; and means for determining the result of the function based on a first additive shares of the result of the function and a second additive shares of the result of the function.

DEFINITIONS

In describing embodiments of the invention, the following definitions are applicable throughout (including above).

A "computer" refers to any apparatus that is capable of accepting an input, processing the input according to prescribed rules, and producing results of the processing as output. Examples of a computer include; a general-purpose computer; a supercomputer; a mainframe; a super mini-computer;

a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "memory" or a "computer-readable medium" refers to any storage for storing data accessible by a computer. Examples include a magnetic hard disk; a floppy disk; an optical disk; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to instructions to operate a computer. Examples of software include software; code segments; instructions; computer programs; and programmed logic.

A "module" or a "unit" refers to a basic component in a computer that performs a task or part of a task. It can be implemented by either software or hardware.

A "network" refers to a number of computers and associated devices that are connected by communication facilities. A network involves permanent connections such as cables, temporary connections such as those made through telephone or other communication links, and/or wireless connections. Examples of a network include an internet, such as the Internet; an intranet; a local area network (LAN); a wide area network (WAN); and a combination of networks, such as an internet and an intranet.

A "SMPC system" refers to any processor of a computational system in which multiple processors jointly determine a result of a function based on individually held secret information, i.e., data, without revealing the information to one another during the computation.

A "SMPC method" refers to any protocol that enables multiple processors to interact in such a way that some or all processors determine the result of the function applied to data stored in multiple processors without disclosing the data stored at one processor to any other processor.

A "SMPC" refers to the SMPC system, or the SMPC method, or both.

DETAILED DESCRIPTION OF THE PREFERRED EMBODIMENTS

Figure 1:
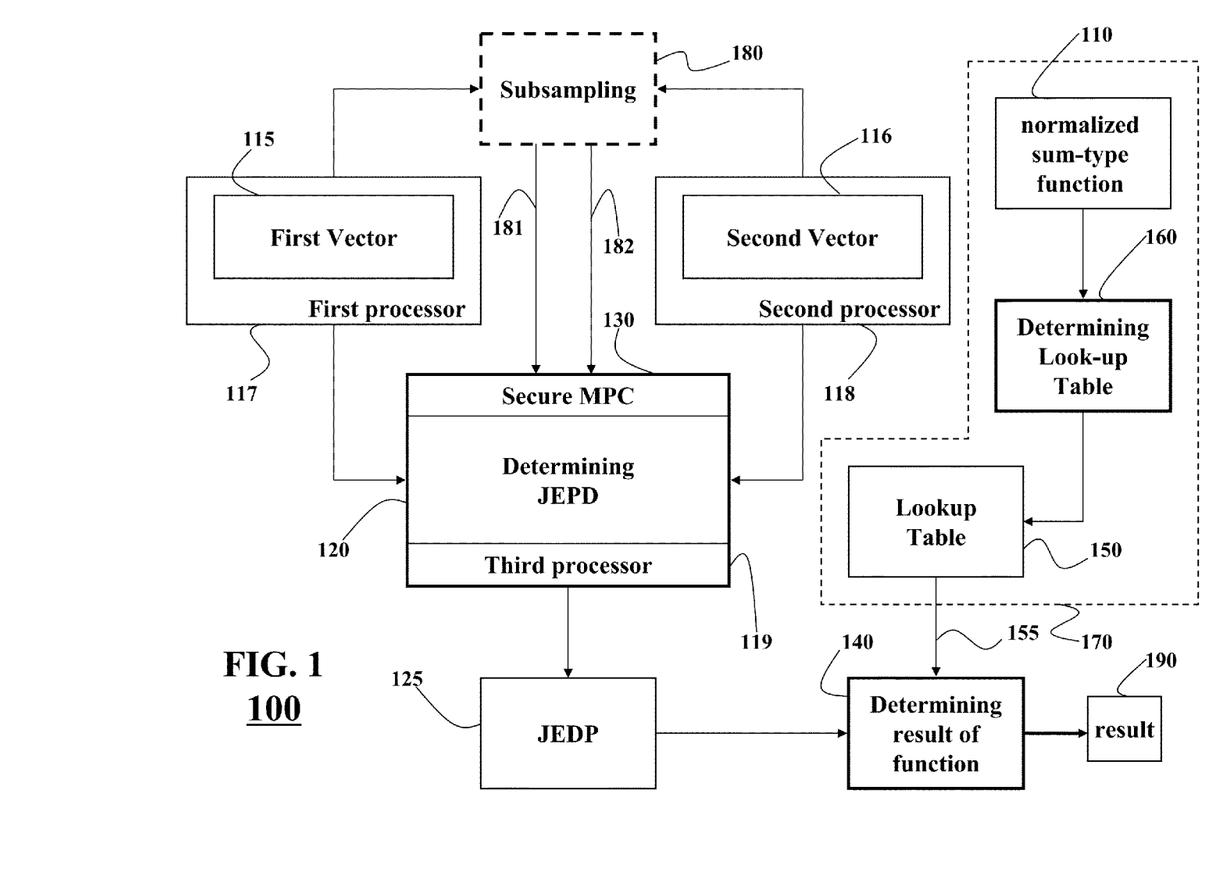
FIG. 1 is a flow diagram of a method for determining a result of applying a function to two signals according to embodiments of invention.

FIG. 1 shows a method 100 for determining a result 190 of applying a function $f$ 110 to a first signal x and a second signal y. The function $f$ is a normalized sum-type function. Embodiments of the invention also determine the result of applying the function to more than two signals. The signals can have any data representation, e.g., vectors, matrix, tables. For example, in some embodiments signals x and y are vectors, i.e., a first vector 115 and a second vector 116. The method is performed using multiple processors, each processor can include memories and input/output interfaces as known in the art. Specifically, the first vector is stored at a first processor 117, the second vector is stored at a second processor 118, and the computation of the function is performed by the first and the second processor, and, optionally, with help of a third processor 119.

Normalized Sum-Type Functions

In various embodiments, the first vector X 115 and a second vectors Y 116, each have n elements. Individual elements of the first vector X are denoted by $X_i$, index i varies from 1 to n. Similarly, individual elements of the second vector Y are denoted by $Y_i$, the index i varies from 1 to n. The function 110 $f(X,Y)$ is a "normalized sum-type function" of the form:

$$f(X, Y) = \frac{1}{n}\sum_{i=1}^{n} f(X_i, Y_i).$$

Embodiments of an invention are based on the realization that every normalized sum-type function is expressible in terms of a joint empirical probability distribution (JEPD). Moreover, the JEPD of the function is independent of the complexity of the function. Therefore, instead of determining the result of the function using secure multi-party computation (SMPC) as in conventional systems, the embodiments determine 120 the JEPD 125 of the first and the second vectors using a secure MPC 130 and, then, determine 140 the result 190 of the function 110 as a normalized summation of products of values of the JEPD with corresponding values 155 of the function.

In some embodiments, the function is explicitly stored in the form of a lookup table 150 in a memory. The table stores possible pairs (x, y) of values of the first and the second vectors and corresponding results of the function $f(x, y)$.

In one embodiment, the lookup table is determined 160 in advance by a processor 170. Alternatively or additionally, the lookup table can be determined and stored by any of the first, the second, and the third processor.

Joint Empirical Probability Distribution (JEDP)

Given vectors X and Y of length n, the JEDP H(x, y) of the elements of the two vectors X and Y is $$H(x, y) = \frac{N(x, y)}{n}, \quad (1)$$

where N(x, y) is the number of occurrences of the pair of singleton elements (x, y) in the vectors X and Y. N(x, y) is also referred to as the joint histogram of two vectors X and Y.

Some embodiments of the invention use a partial JEPD of the two vectors X and Y. Those embodiments subsample 180 the first and second vectors by selecting at random m<n elements from each vector to produce a subsampled first vector X' 181 and a subsampled second vector Y' 182. The elements m are selected from the same positions in the first and the second vectors.

The partial JEDP H'(x, y) is determined according to $$H'(x, y) = \frac{L(x, y)}{m},$$

where $L(x, y)$ is a number of occurrences of the pair of singleton elements $(x, y)$ in the randomly subsampled vectors $X'$ and $Y'$. $L(x, y)$ is also referred to as a partial joint histogram of the vectors $X$ and $Y$.

The normalized sum-type functions can be expressed in terms of JEPD as $$f(X, Y) = \frac{1}{n}\sum_{i=1}^{n} f(X_i, Y_i) \quad (2)$$
$$= \frac{1}{n}\sum_{x,y} f(x, y)N(x, y)$$
$$= \sum_{x,y} f(x, y)H(x, y)$$

The right hand side term shows that, to determine the function $f(X, Y)$, it is sufficient to evaluate $f(x, y)$ at all pairs $(x, y)$ and then to scale the value of the function based on the JEPD. Therefore, to compute the function $f(X, Y)$ securely, it is sufficient for the first processor, the second processor and the third processor to determined the JEPD $H(x, y)$ such that the first processor does not discover the second vector $Y$ and the second processor does not discover the first vector $X$ and the third processor does not discover both vectors $X$ and $Y$.

The realization behind the embodiments of the invention reveals a source of a problem to be solved and solves the problem in a way that is unconventional in the field of SMPC.

Conventional approaches in determining a result of a complicated function are to design the SMPC protocol to the specifics of that function. Conventionally, the function is expressed as an algebraic expression, and then cryptographic primitives are used to evaluate the algebraic expression. However, in many applications, it is difficult to express the function algebraically, or even impossible, making the conventional SMPC correspondingly difficult, or impossible to apply.

Furthermore, in some applications, the function is specified only as a table of values, such that no expression of the function is provided. For those applications, methods such as Lagrange interpolation are used to derive a polynomial expression for the function. If the polynomial has a very high degree, then the algebraic expression used to represent the function is usually very complex, and hence the SMPC protocol to evaluate that expression is even more complex. As described below, the embodiments employing the principles of the invention avoid the need to determine the expression of the function.

Accordingly, the embodiments of the invention achieve superior results over conventional SMPC methods. Specifically, embodiments of the invention separate determination of the function from the determination of the JEDP of the two vectors, which in a number of applications significantly decreases computational complexity and transmission overhead.

For example, one embodiment determines the result of the function, which does not have a closed-form expression. This function is specified explicitly in the form of a look-up table containing all possible pairs $(x, y)$ and the corresponding values $f(x, y)$. The embodiments execute the SMPC protocol that determines the JEPD $H(x, y)$ in a privacy-preserving manner and use the JEPD to obtain the result of the function $f(x, y)$.

Similarly, in another embodiment, the function $f(.,.)$ has a complicated expression, for example, $$f(X, Y) = \frac{1}{n}\sum_{i=1}^{n} \lfloor \log(X_i, Y_i) \rfloor.$$

In this case, a conventional privacy-preserving protocol for the function $f$ has extremely high computational complexity at each processor and the transmission overhead between any pair of processors is impractically high. In some embodiments, evaluating $f$ using a state-of-the-art privacy-preserving protocol may even be impossible.

Using Equation (2), the embodiments do not construct such a protocol for the function $f$. Instead, the SMPC is used to determine the JEPD, with a significantly lower computational complexity and lower transmission overhead.

SMPC for Determining JEPD

In general, embodiments of the invention can use any SMPC protocol configured to determine the JEPD. Such SMPC protocols include, but are not limited to, protocols based on computational secrecy or unconditional secrecy.

One embodiment determines the JEPD using cryptographic primitives, such as public key encryption, oblivious transfer and homomorphic functions. This form of secrecy, achieved by means of cryptographic primitives is the computational secrecy, i.e., secrecy depends on the assumption that some mathematical problem, such as factorization of large numbers, is difficult to solve.

One variation of this embodiment uses polynomial secret sharing to determine additive shares of the histogram, or equivalently, the JEPD. The polynomial secret sharing applied to directly evaluate additive shares of any general function is complicated in terms of the transmission overhead and the computational complexity. However, our realization is that the additive shares of the JEPD are always computable at low transmission overhead and low computational complexity.

Another embodiment determines the JEPD with unconditional secrecy. This embodiment is based on another realization that the JEPD of two vectors is invariant to obfuscation, as described in more details below.

As defined herein, and using the plain meaning, obfuscation is the concealment of intended meaning in communication, making communication confusing, intentionally ambiguous, and more difficult to interpret. Specifically, as known in the art of cryptography, obfuscation refers to encoding data by some encryption scheme to preserve secrecy.

Some embodiments consider the fact that polynomial secret sharing based approaches provide unconditional secrecy as opposed to computational secrecy. Because unconditional secrecy does not rest on unproven mathematical assumptions, it is considered a stronger notion of secrecy than computational secrecy.

SMPC Based on the Invariance of the JEPD to Obfuscation

Figure 2:
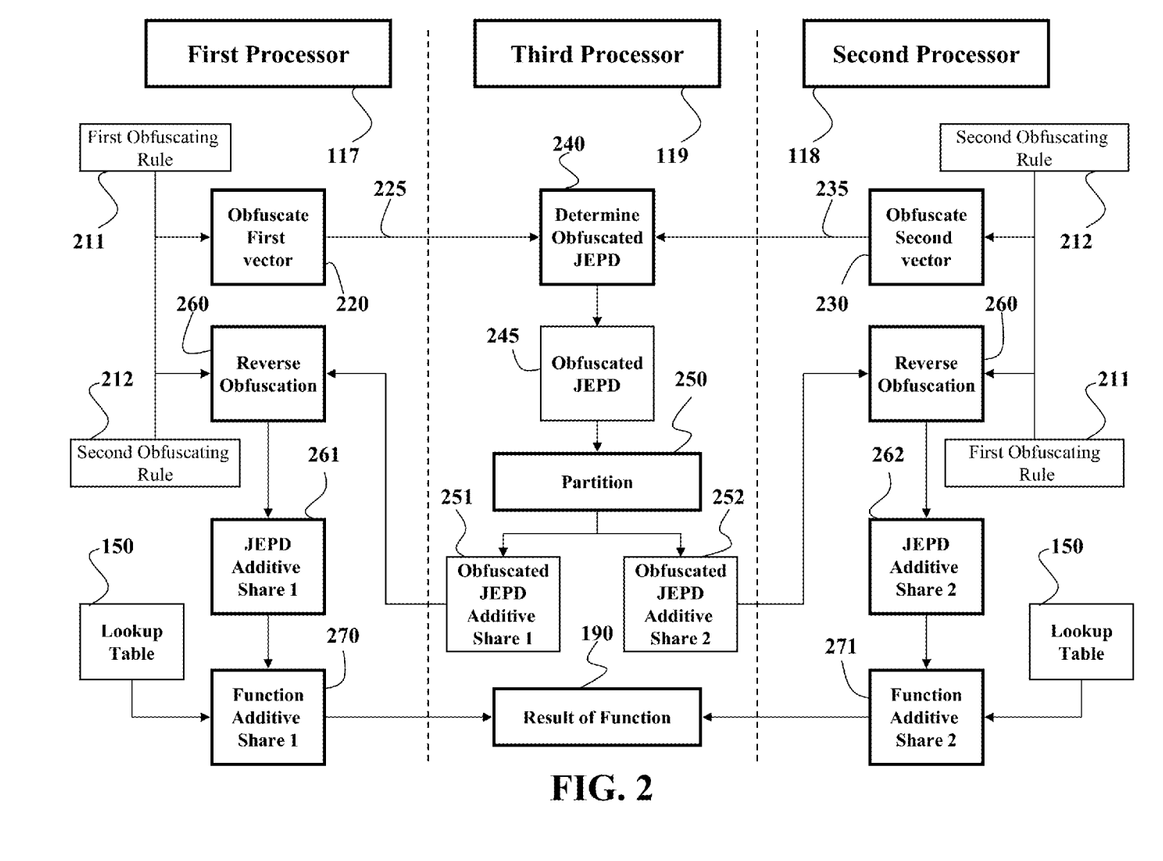
FIG. 2 is a flow diagram of a method for determining the result of the function using additive sharing and reversible obfuscation.

FIG. 2 shows a method for determining the result 190 of applying the function 110 to the vectors 115-116 using additive sharing and reversible obfuscation of the two vectors. This embodiment considers a semi-honest setting, wherein each processor follows the rules, i.e., the steps of the method correctly, and each processor is curious, i.e., it uses the information gained during the steps of the protocol to infer as much information as possible about the data available to the other processors. The semi-honest setting is also called an "honest-but-curious" setting.

The first processor 117 reversibly obfuscates 220 the first vector based on a first rule of obfuscation 211. For example, the first processor obfuscates the first vector X to produce a first obfuscated vector X* 225. The first processor transmits the first obfuscated vector X* to the third processor 119.

In one variation of this embodiment, the first processor randomly selects a first pad vector W of n symbols from the same symbol alphabet A as the elements of the first vector X. In some embodiments, the alphabet A is binary. In other embodiments, the alphabet is a finite positive number of values denoted by |A|. Then, each element of the first obfuscated vector X* is produced by combining the corresponding elements from vectors X and W via an additive operation while treating the symbol alphabets as a finite additive group according to $$X^* = X + W \bmod |A|.$$

Similarly, the second processor 118 reversibly obfuscates 230 the second vector based on a second rule of obfuscation 212 to produce a second obfuscated vector Y*, and transmits the second obfuscated vector Y* to the third processor. For example, the second processor randomly selects a second pad vector Z of n symbols. Usually, the elements of the vectors Y and Z belong to the same alphabet set B, which has |B| elements. As described above, in some embodiments |B|=2. The second vector is obfuscated according to $$Y^* = Y + Z \bmod |B|.$$

The third processor determines 240 an obfuscated JEPD 245, based on and in response to receiving the first vector and the second vector, wherein the first and the second vectors are reversibly obfuscated based on a first and a second rules of obfuscation, respectively. For example, in one embodiment, for every corresponding pair of elements denoted by $(X^*_i, Y^*_i)$ from the two received vectors X* and Y*, the third processor determines an indicator matrix $M_i$ with |A| rows and |B| columns. For each index i ranging from 1 to n, the indicator matrix $M_i$ represents an indicator function for the pair $(X^*_i, Y^*_i)$. Thus, the element in the $(X^*_i, Y^*_i)$ position of the matrix is set to 1, while all other elements are set to 0. Accordingly, a set of indicator matrices represents the obfuscated JEPD.

Next, the third processor partitions 250 the obfuscated JEPD into a first additive share 251 and a second additive share 252, and transmits the first and the second additive shares to the first and the second processors, respectively.

For example, in the embodiment described above, the third processor partitions each indicator matrix $M_i$ into additive shares $M_{\{A,i\}}$ and $M_{\{B,i\}}$, by randomly selecting two matrices taking values over a sufficiently large finite-field, such that an element-wise finite-field addition is $M_i$. Thus, $M_i = M_{\{A,i\}} + M_{\{B,i\}} \bmod F$, where F is a finite-field of a size greater than sizes of the alphabets |A| and |B|. Accordingly, the third processor transmits the set of indicator matrices $M_{\{A,1\}}, M_{\{A,2\}}, \ldots, M_{\{A,n\}}$ to the first processor, and the set of indicator matrices $M_{\{B,1\}}, M_{\{B,2\}}, \ldots, M_{\{B,n\}}$ to the second processor.

The first and the second processors apply reverse obfuscation 260 of the additive shares using the first and the second rules of obfuscations. To that end, in one embodiment, the first and the second processors exchange the rules of obfuscations. For example, the first processor transmits the first pad vector W to the second processor, and the second processor transmits the second pad vector Z to the first processor.

In one variation of this embodiment, the first and the second pad vectors are identical, i.e., W=Z. However, if the pad vectors W and Z are different, the first processor uses the pad vectors W and Z to rearrange the rows and columns of indicator matrices $M_{\{A,1\}}, M_{\{A,2\}}, \ldots, M_{\{A,n\}}$ such that each indicator matrix become an additive share of an indicator function matrix, corresponding to each pair of elements in the vectors X and Y.

Similarly, the second processor rearranges the rows and columns of the indicator matrices $M_{\{B,1\}}, M_{\{B,2\}}, \ldots, M_{\{B,n\}}$ using the pad vectors W and Z.

Then, the first processor adds the rearranged matrices to produce a matrix $N_A$, which is an additive share 261 of a matrix representing the JEPD. The second processor adds the rearranged matrices to produce a matrix $N_B$, i.e., a corresponding additive share 262 of the JEPD.

Using the additive shares of the JEPD, the first and the second processors determine a first additive share $F_A$ 270 and a second additive share $F_B$ 271 of the result 190 of the function 110. In one embodiment, the additive shares of the result of the function are determined according the Equation (1) using the lookup table 150. For example, the first processor determines the first additive share of $f(X,Y)$ according to $$F_A = \sum_{x,y} f(x,y) N_A(x,y),$$

and the second processor determines the second additive share of $f(X,Y)$ according to $$F_B = \sum_{x,y} f(x,y) N_B(x,y).$$

Next, the result of the function is determined by the third processor based on the first and the second additive shares of the result of the function received from the first and the second processor, respectively. Additionally or alternatively, the first and the second processors can modify the respective additive shares of the result of the function by subtracting and adding the common modifier to the first and the second additive shares of the result of the function, such that the total sum of the additive shares is not changed.

For example, the first and the second processors determine a common modifier S, e.g., a number randomly selected by the first processor and transmitted to the second processor. The first processor transmits $F_A + S$ to the third processor. The second processor transmits $F_B - S$ to the third processor. The third processor adds the received additive shares and determines $F_A + S + F_B - S = F_A - F_B = f(X, Y)$.

EXAMPLE

Figure 3:
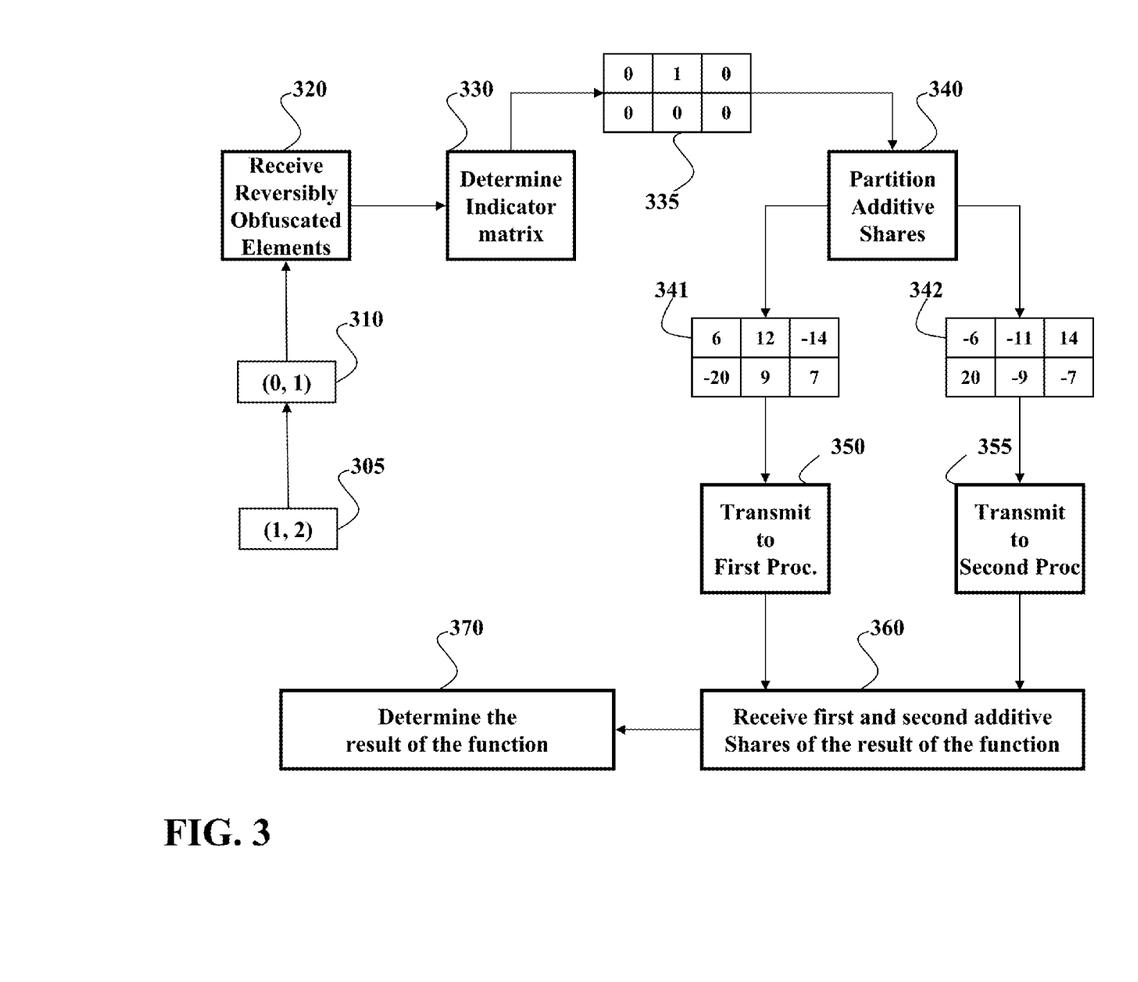
FIGS. 3-4 are example flow diagrams for determining the result of the function according to the embodiments of the invention.

FIG. 3 shows an example of determining the JEPD for one pair 305 of the elements of the fist and the second vector. The example is not limiting, and provided for clarification purpose only. For example, an element of the first vector $x_i$ is 1, and a corresponding element of the second vector $y_i$ is 2. The size of the alphabet for the first vector is 2, i.e., |A|=2, A={0, 1}. The size of the alphabet for the second vector is 3, i.e., |B|=3, B={0, 1, 2}. The first vector is obfuscated with the first pad vector W, and let say, the corresponding $w_i$=5. The second vector is obfuscated with the second pad vector Z, and let say, the corresponding $z_i$=2.

Thus, the obfuscated element of the first vector $x_i^*$ is $x_i^* = 1+5 \mod 2 = 0$.

Similarly, the obfuscated element of the second vector $y_i^*$ is $y_i^* = 2+2 \mod 3 = 1$.

Accordingly, the third vector receives 320 reversibly obfuscated the pair of elements (0, 1) 310 and determines 330 an indicator matrix 335. The element in the ($x_i^*$, $y_i^*$) position of the matrix is set to 1, while all other elements are set to 0, as shown in FIG. 3. The indicator matrix is partitioned 340 into the first and the second additive shares of the indicator matrix, e.g., additive matrices 341 and 342. The partitioning is performed arbitrarily, e.g., randomly. The only requirement is that summation of corresponding elements of the two additive matrices produces the indicator matrix. Next, the two additive shares are transmitted 350 and 355 to the first and the second processor, respectively.

The first and the second processors determine the first and the second additive shares of the result of the function, as described below. The third processors determines 370 the result of the function 190 based on the first and the second additive shares of the result of the function received 360 from the first and the second processor, respectively.

Figure 4:
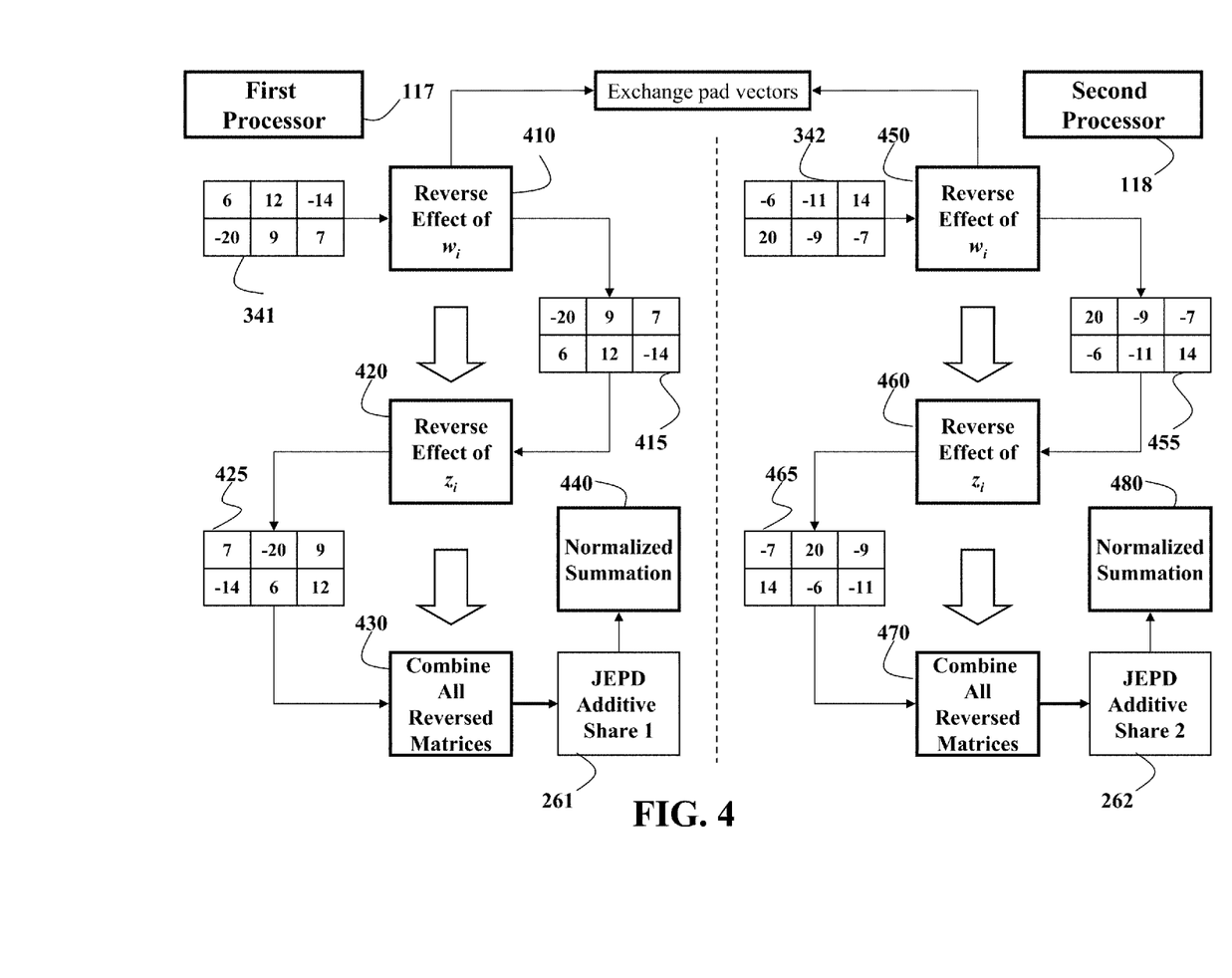

FIG. 4 shows an example of determining additive shares of the result of the function by the first and the second processors. After exchanging 405 the first and the second pad vectors, the first and the second processors reverse 410 and 450 the effect of the obfuscation. For example, because $w_i \mod 2 = 5 \mod 2 = 1$, the effect of the obfuscation using the first pad vector is reversed by swamping rows of additive shares matrices. The result of swapping is matrices 415 and 455.

Similarly, because $z_i \mod 3 = 2 \mod 3 = 2$, the effect of the obfuscation using the second pad vector is reversed by moving columns of the additive shares matrixes in a direction opposite to the direction of obfuscation, i.e., 2 columns to the left, i.e., −2 columns. The result of this reversion is reversed matrices 425 and 465. Notably, the summation of the matrices 425 and 465 is a matrix with all zero elements except an element (1, 2), which reflects the original values of the elements 305 of the first and the second vector before the obfuscation.

When all corresponding elements of the first and the second vectors are processed, combinations 430 and 470 of all reversed matrices of the first and the second processors are the JEPD additive shares, i.e., the first JEPD additive share 261 and the second JEPD additive share 262. Next, the first and the second additive shares of the result of the function are determined by the first and the second processors as normalized summations 440 and 480 of products of values of the JEPD with corresponding values of the function selected from the lookup table 150.

Random Subsampling

As described above, some embodiments of the invention use a partial JEPD of the two vectors X and Y. Those embodiments subsample 180 the first and second vectors by selecting at random m<n elements from each vector to produce a subsampled first vector X' 181, and a subsampled second vector Y' 182. The elements m should be selected from the same positions in the first and the second vectors. Next, the function $f(X',Y')$ is expressed and solved in terms of the partial JEPD.

The partial JEPD constructed from randomly selected subsamples of X and Y converges to the JEPD constructed from all the elements of X and Y Specifically, the maximum expected absolute error between the partial JEPD based on the subsampled vectors X' and Y', and the JEPD based on all elements is inversely proportional to the square root of m, i.e., the number of subsamples. Accordingly, the result of the function $f(X',Y')$ is an approximation of the result of the function $f(X,Y)$. This approximation converges to $f(X,Y)$ when m is sufficiently large enough, yet much smaller than n.

The advantage of evaluating an approximation of the function by randomly sampling the vectors X and Y is a reduction in the computational complexity at each processor, as well as a reduction in the transmission overhead required by any secure MPC protocol. Both the computational complexity and the transmission overhead are directly proportional to the lengths of the arguments of the functions. Hence, using a smaller set of randomly selected samples for function evaluation is more efficient than using all the elements of the vectors X and Y. This embodiment is particularly relevant to applications where a size of the data is large, and only a highly accurate, but not exact, computation is necessary.

In some embodiments, random subsampling and evaluation of the joint empirical probability distribution can also be computed using only the first two processors.

EFFECT OF THE INVENTION

Embodiments of an invention are based on the realization that every normalized sum-type function is expressible in terms of a joint empirical probability distribution (JEPD). Therefore, to compute a result of the function applied to two vectors using a secure multi-party computation (SMPC), it is sufficient to use the SMPC to compute the JEPD of the two vectors, which in number of applications significantly decreases the computational complexity and transmission overhead.

Knowing the JEPD, a value of the function can be determined as a normalized summation of products of values of the JEPD with corresponding values of the function.

The invention results in a solution that is unconventional in the field of SMPC. Conventional approaches for determining a result of a complex function tune or adjust the SMPC protocol to the specifics of that function. The resulting complexity of those approaches was not considered a problem, but rather accepted as being in the nature of secure computation.

In contrast to the state of the art, embodiments of the invention reduce the determination of the result of the function applied to two vectors securely to the secure determination of the JEDP of the two vectors, which in a number of applications significantly decreases the computational complexity and transmission overhead.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a result of a function applied to a first vector and a second vector, wherein the function is a normalized sum-type function, wherein the first vector is stored at a first processor and the second vector is stored at a second processor, comprising the steps of:

determining a joint empirical probability distribution (JEPD) of the first vector and the second vector using a secure multi-party computation (SMPC); and determining the result of the function as a normalized summation of products of values of the JEPD with corresponding values of the function, wherein the steps of the method are performed by at least the first processor and the second processors.

2. The method of claim 1, further comprising:
determining an obfuscated JEPD, in response to receiving the first vector and the second vector, wherein the first vector and the second vectors are reversibly obfuscated based on a first rule and a second rule of obfuscation, respectively;
partitioning the obfuscated JEPD into a first additive share and a second additive share;
transmitting the first additive share to the first processor and the second additive share to the second processor, such that the first processor reverses the first additive share based on the first rule and the second rule of obfuscation to determine a first additive share of the result of the function, and the second processor reverses the second additive share based on the first rule and the second rule of obfuscation to determine a second additive share of the result of the function; and
determining the result of the function based on the first additive share and the second additive shares of the result of the function received from the first processor and the second processor, respectively.

3. The method of claim 2, further comprising:
determining a set of indicator matrices corresponding to the obfuscated JEPD, such that the each indicator matrix is partitioned into the first additive share and the second additive share.

4. The method of claim 1, wherein the function is explicitly stored in a memory as possible results of the function for corresponding pairs of values of the first vector and the second vector.

5. The method of claim 1, wherein the first vector and the second vector are subsampled by randomly selecting elements from each vector.

6. The method of claim 5, wherein the JEPD is a partial JEPD.

7. The method of claim 1, wherein the SMPC is a protocol selected from the group consisting of: a protocol based on computational secrecy, a protocol based on unconditional secrecy, and combinations thereof.

8. The method of claim 1, wherein the SMPC is based on an invariance of the JEPD to obfuscation of the first vector and the second vector.

9. The method of claim 8, wherein the first vector and the second vector are reversibly obfuscated based on, respectively, a first pad vector and a second pad vector, by combining elements from the first and the second vectors with corresponding elements of the first and the second pad vectors, respectively, wherein respective alphabets of the first and the second vectors are treated as a finite additive group.

10. The method of claim 9, wherein the alphabets are binary.

11. The method of claim 1, further comprising:
receiving the first vector and the second vector in a reversibly obfuscated form;
determining, for each corresponding pair of elements of the first vector and the second vector, a set of indicator matrices representing an obfuscated JEPD;
partitioning the set of indicator matrices into a first additive share and a second additive share;
transmitting the first additive share to the first processor and the second additive share to the second processor, such that the first processor reverses the first additive share based on the first rule and the second rule of obfuscation to determine a first additive share of the result of the function, and the second processor reverses the second additive share based on the first rule and the second rule of obfuscation to determine a second additive share of the result of the function; and
determining the result of the function based on the first additive share and the second additive share of the result of the function received from the first processor and the second processor, respectively.

12. A system for securely determining a result of a function applied to a first vector and a second vector using a third processor, wherein the function is a normalized sum-type function, the first vector is stored only at a first processor, the second vector is stored only at a second processor, comprising:
means for determining a joint empirical probability distribution (JEPD) of the first and the second vector using a secure multi-party computation (SMPC); and
means for determining the function as a normalized summation of products of values of the JEPD with corresponding values of the function, wherein the steps of the method performed at least by the first and the second processors.

13. The system of claim 12, further comprising:
means for receiving the first vector and the second vector in reversibly obfuscated form;
means for determining, for each corresponding pair of elements of the first vector and the second vector, a set of indicator matrices representing an obfuscated JEPD;
means for partitioning the set of indicator matrices into a first additive share and a second additive share;
means for transmitting the first additive share to the first processor and the second additive share to the second processor, such that the first processor reverses the first additive share based on the first and the second rules of obfuscation to determine a first additive share of the result of the function, and the second processor reverses the second additive share based on the first and the second rules of obfuscation to determine a second additive share of the result of the function; and
means for determining the result of the function based on the first and the second additive shares of the result of the function received from the first and the second processor, respectively.

14. The system of claim 12, further comprising:
a memory for storing results of the function for corresponding pairs of values of the first and the second vectors.

* * * * *